United States Patent
Hillmann et al.

(10) Patent No.: US 7,345,747 B2
(45) Date of Patent: Mar. 18, 2008

(54) ARRANGEMENT AND METHOD FOR CHECKING OPTICAL DIFFRACTION STRUCTURES ON DOCUMENTS

(75) Inventors: Juergen Hillmann, Jena (DE); Thomas Burkhart, Jena (DE); Kevin Koelling, Weimar (DE)

(73) Assignee: Cross Match Technologies GmbH, Jena (DE)

( * ) Notice: Subject to any disclaimer, the term of this patent is extended or adjusted under 35 U.S.C. 154(b) by 337 days.

(21) Appl. No.: 11/108,090

(22) Filed: Apr. 14, 2005

(65) Prior Publication Data

US 2005/0237616 A1    Oct. 27, 2005

(30) Foreign Application Priority Data

Apr. 24, 2004    (DE)    ........... 10 2004 020 661

(51) Int. Cl.
*G06K 9/74*    (2006.01)

(52) U.S. Cl. ................ 356/71; 250/555; 250/556

(58) Field of Classification Search ............. 356/71; 250/271, 559.01, 555, 556, 557; 283/82, 283/85

See application file for complete search history.

(56) References Cited

U.S. PATENT DOCUMENTS

| | | | |
|---|---|---|---|
| 4,501,439 A | 2/1985 | Antes | |
| 4,537,504 A | 8/1985 | Baltes et al. | |
| 5,365,084 A | 11/1994 | Cochran et al. | |
| 5,461,239 A * | 10/1995 | Atherton | .............. 250/566 |
| 6,819,409 B1 * | 11/2004 | Tompkin et al. | .............. 356/71 |
| 2002/0131597 A1 | 9/2002 | Hori et al. | |
| 2002/0191175 A1 | 12/2002 | Coombs et al. | |
| 2003/0156274 A1 | 8/2003 | Massen et al. | |
| 2003/0174308 A1 | 9/2003 | Franz-Burgholz et al. | |

FOREIGN PATENT DOCUMENTS

| | | |
|---|---|---|
| DE | 199 24 750 | 10/2000 |
| FR | 99 13880 | 5/2000 |
| WO | WO98/55963 | 12/1998 |
| WO | WO 00/62237 | 10/2000 |
| WO | WO 03/030105 | 4/2003 |
| WO | WO 2004/013817 | 2/2004 |

* cited by examiner

*Primary Examiner*—Gregory J. Toatley, Jr.
*Assistant Examiner*—Roy M. Punnoose
(74) *Attorney, Agent, or Firm*—Reed Smith LLP

(57) ABSTRACT

The invention is directed to an arrangement and a method for checking optical diffraction structures (e.g., kinegrams) on documents. The object of the invention, to find a novel possibility for checking optical diffraction structures on documents which permits detection of the presence and authenticity of optical diffraction structures quickly and economically with respect to apparatus, is met according to the invention in that the sensor unit is arranged orthogonally above the support surface of the document, and in that the illumination unit contains at least two monochromatic light sources which are arranged so as to emit light bundles at defined incident angles with respect to a surface normal of the document directed to the diffraction structure and which can be switched on sequentially. At least one light source has an incident angle that corresponds in direction and degree to a diffraction angle at which an intensity maximum of the diffraction pattern that is generated in a structure-specific manner would occur if the diffraction structure were illuminated from the direction of the sensor unit.

33 Claims, 8 Drawing Sheets

ARRANGEMENT AND METHOD FOR CHECKING OPTICAL DIFFRACTION STRUCTURES ON DOCUMENTS

CROSS-REFERENCE TO RELATED APPLICATIONS

This application claims priority of German Application No. 10 2004 020-661.9, filed Apr. 24, 2004, the complete disclosure of which is hereby incorporated by reference.

a) Field of the Invention

The invention is directed to a method and an arrangement for checking optical diffraction structures on documents in which an illumination unit for illuminating the diffraction structure of the document and a sensor unit for detecting light components that are diffracted at defined angles are arranged above a support surface of the document. The invention is suitable for automated detection of the authenticity of documents on which diffraction structures are arranged or within whose material such diffraction structures are incorporated.

b) Description of the Related Art

In personal documents, ID cards, bank notes, and the like (hereinafter: documents), various security features such as optical diffraction structures (e.g., kinegrams), watermarks, images and holograms are arranged on the surface or are laminated in so as to remain visible in order to prevent forgeries. In this regard, a distinction is made between security features for visual assessment and security features for mechanical checking.

Security features for visual assessment are inspected visually at different angles of inclination against a light source (including daylight) and their overall graphic impression is evaluated.

Optical diffraction structures for mechanical checking are designed in such a way that a laser beam for a determined diffraction structure that is incident orthogonal to the document plane generates a defined quantity of diffraction maxima at specific angles in the half-space over the document. The diffracted light beams can be displayed on a screen (U.S. Patents 2003/0156274 A1, 2003/0174308 A1) or are detected by receivers positioned at corresponding solid angles (U.S. Pat. No. 4,537,504; WO 98/55963).

Both of these arrangements have substantial drawbacks for mechanical evaluation. Either the document must be precisely positioned so that the laser beam impinges on the optical diffraction structure, or the laser must be tracked with the associated evaluating unit, as is described in U.S. 2003/0156274 A1.

An expanded laser beam, which would lessen the demands on positioning accuracy, requires a higher laser output for fast and reliable detection of the deflected beams and accordingly increases the risk of interfering reflections from the surroundings of the optical diffraction structure to be tested which could also be injurious to the user. Further, an expanded beam also requires that the optical diffraction structure be located at a determined, previously known point on the document or that the document be positioned in such a way that the optical diffraction structure is located at a determined place in the checking unit. In addition, the use of lasers in the checking devices requires an expenditure on radiation safety that increases as the laser output increases, particularly when the document to be checked must be positioned in or on the device by a person.

There are other disadvantages in the checking methods mentioned above when the document must also be optically read or detected through the use of data systems in addition to mechanical checking for authenticity.

On the one hand, a plurality of receivers or a screen must be positioned in the beam path for the checking process to detect the beams deflected by the optical diffraction structures and must then be removed again for optical imaging of the document. The positioning units required for this purpose are subject to wear and therefore shorten the life of the apparatus and generate high maintenance costs. Further, the additional time required for positioning prolongs the checking process.

When the receivers are arranged outside the area needed for optical readout, the checking arrangement is very sensitive to deviations in the position of the optical diffraction structure due to the long paths between the optical diffraction structure and the receivers; otherwise the receivers must be very large, which increases sensitivity to scatter radiation and unwanted reflections.

OBJECT AND SUMMARY OF THE INVENTION

It is the primary object of the invention to find a novel possibility for checking optical diffraction structures on documents which permits detection of the presence and authenticity of optical diffraction structures quickly and economically with respect to apparatus. A further object is to make possible an optical readout of text data and/or image data with the same checking device without movement of mechanical parts or of the checked document.

In an arrangement for checking optical diffraction structures on documents in which an illumination unit for illuminating at least the diffraction structure of the document and a sensor unit for detecting light components that are diffracted at defined angles are arranged above a support surface of the document, the above-stated object is met, according to the invention, in that the sensor unit is arranged orthogonally above the support surface of the document, in that the illumination unit contains at least two monochromatic light sources which are arranged so as to emit light bundles at defined incident angles with respect to a surface normal of the document directed to the diffraction structure and which can be switched on sequentially, at least one light source having an incident angle that corresponds in direction and degree to a diffraction angle at which an intensity maximum of the diffraction pattern that is generated in a structure-specific manner would occur if the diffraction structure were illuminated from the direction of the sensor unit, and in that the sensor unit is synchronized with the illumination unit in order to detect diffraction signals associated with the switched on light sources.

The light sources of the illumination unit are advantageously arranged at different incident angles (in the half-space above the support surface of the document) which correspond respectively, with respect to their degree and direction, to different diffraction angles of the diffraction structure.

The illumination unit preferably has at least one additional light source (which can also be one of only two light sources) in which the direction and degree of the incident angle are not associated with any defined diffraction angle of the diffraction structure (negative test of the diffraction structure).

The illumination unit advisably contains two-dimensional light sources so that checking of the document is not sensitive to different positions of the diffraction structure to be checked. For this purpose, light sources with an expanded parallel light bundle are advantageously provided in the illumination unit for illuminating the entire diffraction structure at defined angles. However, groups of closely adjacent light sources can also advisably be provided in the illumination unit for illuminating the entire diffraction structure at defined angles over a large area.

The illumination unit advantageously has at least one two-dimensional light source array, wherein the light sources of the light source array can be controlled individually or in groups. The light source array advantageously comprises light emitting diodes (LEDs). However, the illumination unit can also contain at least one microprism foil in order to multiply the light source locations.

Further, it is advantageous when the illumination unit has at least one microlens foil or Fresnel lenses for parallelizing the illumination.

The illumination unit advisably contains a plurality of two-dimensional light source arrays that are arranged at an inclination parallel to the edges of the document to be checked and whose light sources can be switched on individually. In this connection, at least two oppositely located light source arrays preferably have the same dimensions and inclination.

In a particularly advantageous construction of the invention, the sensor unit has an image sensor which is provided for successively recording an optical image of the document and a light bundle that is diffracted by the diffraction structure, and the illumination unit contains additional light sources for generating illumination which is suitable for recording the optical image and which advisably has white light sources, UV light sources and/or IR light sources.

In this construction of the invention, the diffraction structure can advantageously be checked for authenticity in any position relative to the image sensor when its position has been determined from the optical image of the entire document, wherein suitable light sources or groups of light sources can be switched on such that light bundles that are diffracted at the diffraction structure impinge, or—in the negative test—do not impinge, on the image sensor in a defined manner.

In a specially developed variant, the image sensor is designed for additional image recording of diffraction patterns for visual assessment, and specific groups of light sources of the illumination unit for evaluating visual diffraction patterns are directed at defined angles to the visual diffraction pattern and are recorded as an image.

Further, in a method for checking optical diffraction structures on documents in which light components that are diffracted by a diffraction structure at defined angles are detected by a sensor unit above a support surface of the document, the object of the invention is met by the following sequence of steps:

at least two monochromatic light sources are directed to the diffraction structure at defined incident angles with respect to the surface normal of the diffraction structure and of the sensor unit, wherein at least one light source illuminates the diffraction structure at an incident angle which corresponds in direction and degree to a diffraction angle of the diffraction structure, at which diffraction angle there would occur an intensity maximum of a diffraction pattern that is generated in a structure-specific manner if the diffraction structure were illuminated from the direction of the sensor unit, and different light sources with different incident angles are switched on, the sensor unit is read out synchronous to the differently positioned light sources in order to detect diffraction signals associated with the switched on light sources in the normal direction of the diffraction structure.

The diffraction structure is advantageously illuminated with respect to the surface normal by at least two light sources at defined incident angles which would correspond, respectively, in direction and degree to one of the different diffraction angles of the diffraction pattern of the diffraction structure if the diffraction structure were illuminated from the direction of the sensor unit.

It has proven particularly advantageous when the diffraction structure is illuminated by at least one suitable light source with respect to the surface normal of the diffraction structure at an incident angle that would correspond in direction and degree to a diffraction angle of an intensity maximum of the specific diffraction pattern of the diffraction structure if the diffraction structure were illuminated from the direction of the sensor unit and by at least one additional light source at a different incident angle that does not correspond to a diffraction angle of the diffraction structure.

However, the diffraction structure can advisably also be illuminated simultaneously by at least two suitable light sources at different incident angles which correspond, respectively, to an occurring diffraction angle of the diffraction structure, in which case the sensor unit receives a sum signal of the intensities of the light bundles that are diffracted by the diffraction structure.

It has proven advantageous when, in addition to the diffraction signals from the diffraction structure that are detected by the sensor unit, an optical image of the document is recorded beforehand by means of an image sensor for detecting image data and text information in order to initially clarify which diffraction pattern is to be checked, particularly when checking different document types (e.g., personal documents from different governments, different ID cards, etc.).

In order to illuminate different diffraction structures of different types of documents, light sources arranged in the illumination unit in uniformly ordered light source arrays are advantageously selected in a manner suited to the respective diffraction structure and are switched on in a corresponding manner.

In this connection, the type and position of the diffraction structure is determined from the image information in relation to the normal direction of the image sensor and suitable light sources of the light source arrays, for which the incident angle of the light source and the exit angle of the light bundle diffracted by a known diffraction structure, taken together, lead to a defined diffraction signal on the image sensor, are switched on preferably in series. However, they can also be switched on simultaneously as groups of light sources with different incident angles with respect to the diffraction structure in order to detect a sum signal of intensities of different light bundles that are diffracted at the diffraction structure, so that test results (positive test of the diffraction structure) are achieved within a very short measuring period.

When the position and type of diffraction structure are known, but the sensor unit is not located exactly perpendicularly over the optical diffraction structure to be checked, there is nevertheless, for every position of the diffraction structure, a fixed relationship between the angle enclosed by the perpendicular to the document and the light bundle from the optical diffraction structure to the sensor unit and the angle enclosed by the light bundle of the light source to the optical diffraction structure with the normal direction of the support surface of the document. Based on this relationship, a definite relationship can always be drawn between the position of the sensor unit and the position of the light sources whose light beams that are deflected at the diffraction structure impinge on the sensor unit. The fact that the incident angle of an impinging light beam is never equal to the exit angle in optical diffraction structures, in contrast to the reflecting surfaces, is made use of for this purpose.

After switching on suitable light sources for detecting a diffraction signal on the sensor unit, additional light sources of the light source arrays for which the incident angle of the light source and the exit angle of the diffracted light bundle, taken together, may not generate a diffraction signal on the image sensor in a known diffraction structure (negative test of diffraction structure) are advantageously switched on.

In order to make checking less sensitive to slight displacements of the diffraction structure, groups of adjacent light sources with a substantially identical incident angle are advisably switched on simultaneously for complete illumination of the diffraction structure.

In order to determine suitable light sources for checking the diffraction structure of a new document type, the suitable light sources are advisably learned in that an authorized template or model document with variously positioned diffraction structure is provided by selecting and storing the positions of the light sources at which diffracted light bundles result in a sufficiently large (preferably maximum) diffraction signal on the image sensor.

Further, it has proven advantageous for checking the diffraction structure of a new document type when, in addition to learning suitable light sources, additional light sources with which no diffraction signal is generated on the image sensor are learned in that the authorized model document with variously positioned diffraction structures is provided by selecting and storing positions of the additional light sources which preferably lie in the vicinity of the light sources that are suitable for recording diffracted light.

For both of the learned positions of light sources mentioned above (for positive and/or negative testing), positions of light sources with which light that is diffracted at the diffraction structure (still) results in a sufficiently distinctive diffraction signal (above a defined threshold) on the image sensor are also advantageously learned and stored in order to compensate for slight positional deviations of the diffraction structure.

The invention makes it possible to check optical diffraction structures on documents so that the presence and authenticity of the optical diffraction structures can be detected quickly and economically with respect t o apparatus.

This same checking device makes it possible to detect text data and/or image data of the document by means of optical imaging without movement of mechanical parts or of the checked document. The arrangement, according to the invention, makes do without a laser source and therefore does not require any special radiation safety measures for the checking device. Point light sources or light sources with defined expansion which radiate on the optical diffraction structure at a defined angle relative to the normal direction are arranged for detecting and checking the optical diffraction structures. The use of light sources with a light bundle whose diameter is somewhat lager than the optical diffraction structure renders the arrangement insensitive to the displacement or rotation of the document.

When using light source arrays (e.g., LED matrices) together with an image sensor, there are always LEDs whose bundles are deflected by the diffraction structure in such a way that they are received by the image sensor. Consequently, no separate receivers are needed for image recording and checking of the diffraction structure of a document. Depending upon the type of document and, therefore, upon the different diffraction structure, the light sources required for checking can be determined and stored in a simple manner in a learning process with authorized model documents.

The invention will be described more fully in the following with reference to embodiment examples.

DESCRIPTION OF THE PREFERRED EMBODIMENTS

Figure 1:
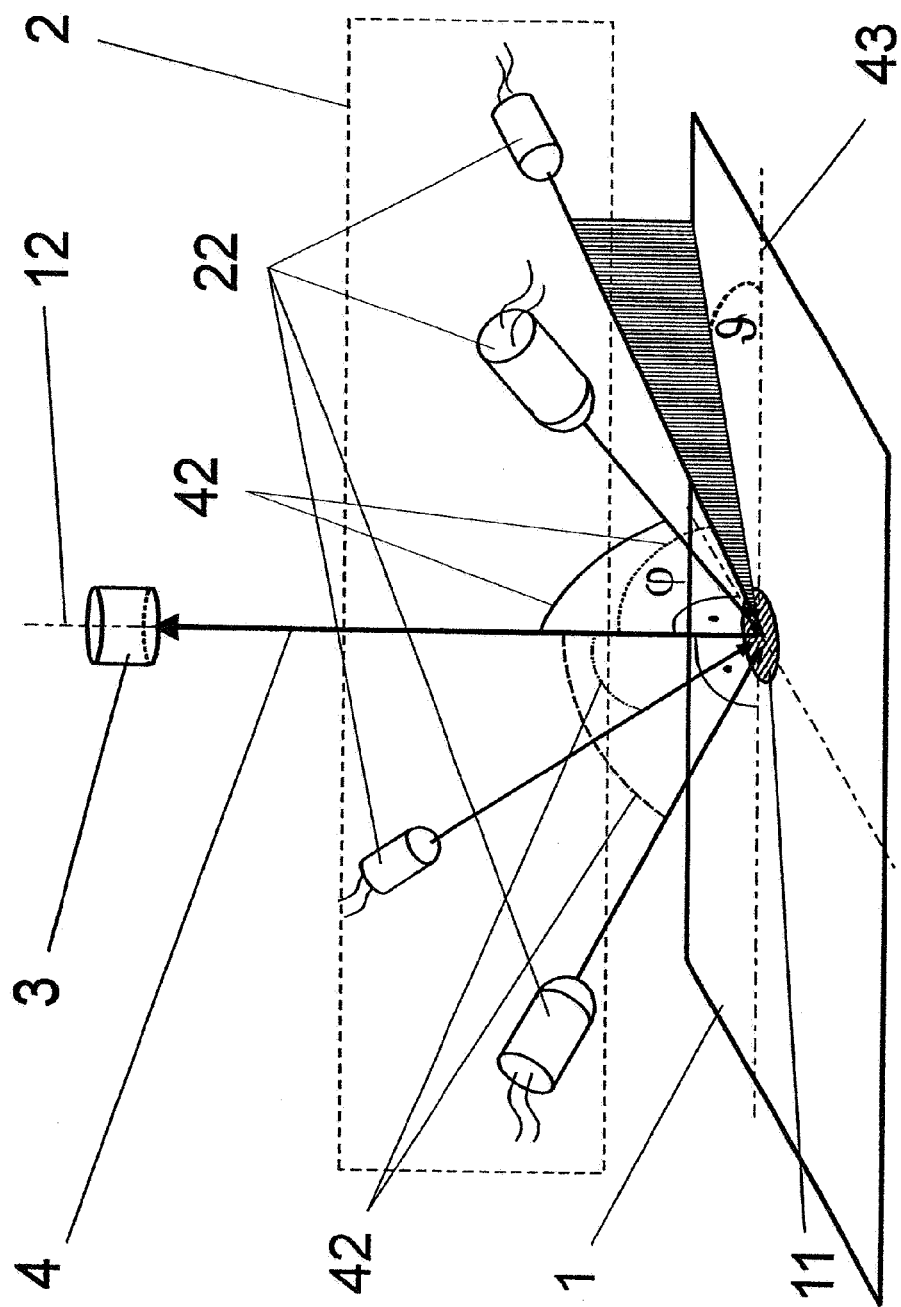
FIG. 1 shows a schematic view of an arrangement, according to the invention, for checking the optical diffraction structure (kinegram) with a sensor in the normal direction above the diffraction structure and with light sources in positions corresponding to those of the intensity pattern with coherent illumination in normal direction.

The basic construction of the invention—as it is shown in the arrangement according to FIG. 1—comprises a support surface (not shown separately) for the document 1 which has an optical diffraction structure 11 (e.g., a kinegram, as it is called) as the security feature to be checked, an illumination unit 2 with a plurality of light sources 22 which direct light bundles on the diffraction structure 11 at defined incident angles 42 relative to the surface normal 12 of the diffraction structure 11, and a sensor unit 3 arranged above the diffraction structure 11. The incident angles 42 are generally angles in the half-space above the document 1, i.e., they have a component with respect to the surface normal 12 and a component within the document plane with respect to a parallel axis 43 relative to one of the outer edges of the document 1.

The different incident angles 42 of the light sources 22 are selected in such a way, corresponding to the specific diffraction structure 11 of the document 1, that the diffracted light bundles 4 all impinge on the sensor unit 3 and run along the surface normal 12 in the configuration shown in FIG. 1. This is achieved in that the incident angles 42 of the light sources 22 correspond in degree and direction to the angles that would occur as exit angles of the diffracted light bundles 41 (see FIGS. 2 and 3) if the diffraction structure 11 were irradiated with laser illumination (according to the prior art) from the direction of the surface normal 12.

Figure 2:
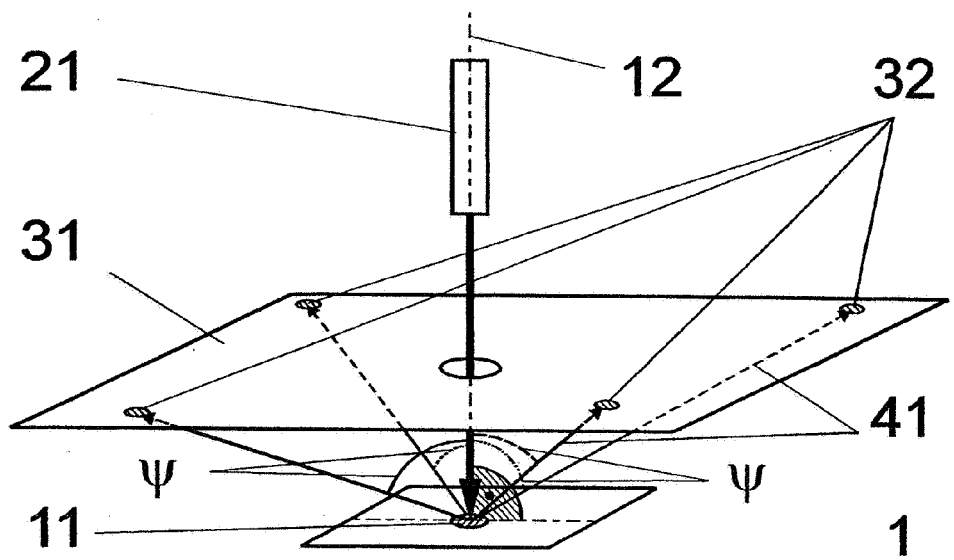
FIG. 2 illustrates the evaluation of the diffraction pattern, according to the prior art, with a laser source whose beam impinges orthogonally on a diffraction structure through the opening in a screen and generates a diffraction intensity pattern on the screen.

FIG. 2 shows a known method of the prior art with a laser 21 whose beam impinges orthogonally on an optical diffraction structure 11 on the document 1 through an opening of the screen 31. In the present example, the optical diffraction structure 11 generates the four deflected beams 41 which generate diffraction patterns 32 of light 41—diffracted by intensity maxima—at defined angles and intensities depending on the characteristics of the optical diffraction structure 11 when impinging on the screen 31.

The distribution of the diffraction pattern 32 on the screen 31 with respect to the impinging beam of the laser 21 depends only on the distance of the screen 31 from the document 1 and on the characteristics of the optical diffraction structure 11 when the planes of the document 1 and of the screen 1 lie parallel. Accordingly, the location where the diffracted light 47 must impinge on the screen 31 is known already before checking. Therefore, it is possible to draw conclusions about the authenticity and/or validity of the optical diffraction structure 11 based on the position and intensities of the diffraction pattern 32 on the screen 31.

By means of this arrangement of the prior art, checking can be carried out visually or by means of an image recording system to ascertain whether or not the diffraction pattern 32 appears at the correct locations on the screen 31 and, therefore, whether or not the document being checked is valid (not forged). For automatic checking of the validity of the document, a separate image evaluation is required because the document 1 cannot be optically imaged—because of the screen 31—and analyzed for receiving text information and image information or the screen 31 must be moved mechanically in order to temporarily remove it for image recording.

Figure 3:
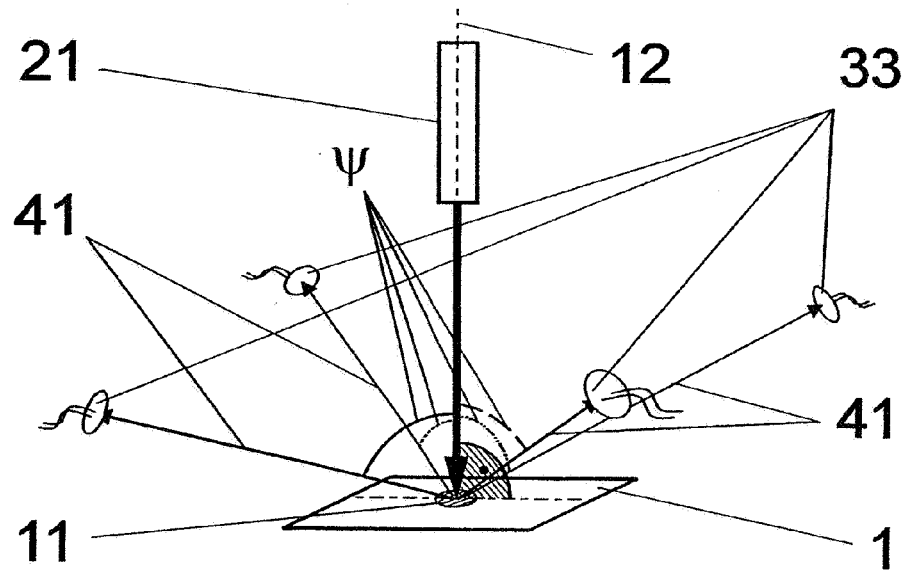
FIG. 3 shows the prior art with laser illumination in normal direction and with a plurality of receivers at the locations of the maxima of the diffraction pattern.

FIG. 3 shows a method according to the prior art in which the screen 31 is replaced by a plurality of receivers 33 associated with the diffraction pattern 32 (or selected intensity maxima thereof). Therefore, the document 1 is no longer covered by a screen and can be optically read out at the same time that the diffraction structure 11 is checked.

In an arrangement of the kind mentioned above, the diffraction structure 11 and the receivers 33 must be positioned at locations that are exactly known beforehand, i.e., only documents 1 of a type that always has the same diffraction structure 11 at the same location can be checked. Further, the documents can be checked automatically only when their diffraction structure 11 is always located in the same place beneath the laser 21 because the arrangement reacts very sensitively to displacement or rotation of the document 1.

The makeup and function of the method according to the invention for checking the diffraction structure 11 become appreciably clearer through comparison with FIG. 1. Individual light sources 22 of the illumination unit 2 whose beams impinge on the diffraction structure 11 and are deflected in direction of the surface normal 12 of the document 1 (corresponding to the direction of the incident laser beam in FIGS. 2 and 3) are arranged at the positions of the receivers 33 shown in FIG. 2. A sensor unit 3 which minimally has only one individual receiver detecting the incident light is positioned in place of the laser 21. Checking can be carried out, depending on the characteristics of the diffraction structure 11, by evaluating the sum signal of all four light sources 22 or by switching on the light sources 22 in series and checking the individual signals.

By arranging additional light sources (not shown in FIG. 1) in positions in which no diffracted light 4 is directed onto the receiver unit 3 when the diffraction structure 11 is irradiated (so-called negative test), the checking of the authenticity of the diffraction structure 11 can be made more certain. Forged documents having a different material or different structure at the location of the optical diffraction structure 11 that may also happen to generate reflections when illuminated by the light sources 22 can be discovered in this way. Therefore, this step is important or virtually necessary because—in contrast to FIG. 2—rather than checking the whole diffraction pattern 32, only selected intensity maxima are detected (as was also already the case in the prior art according to FIG. 3) for quick automatic checking of documents 1.

Figure 4:
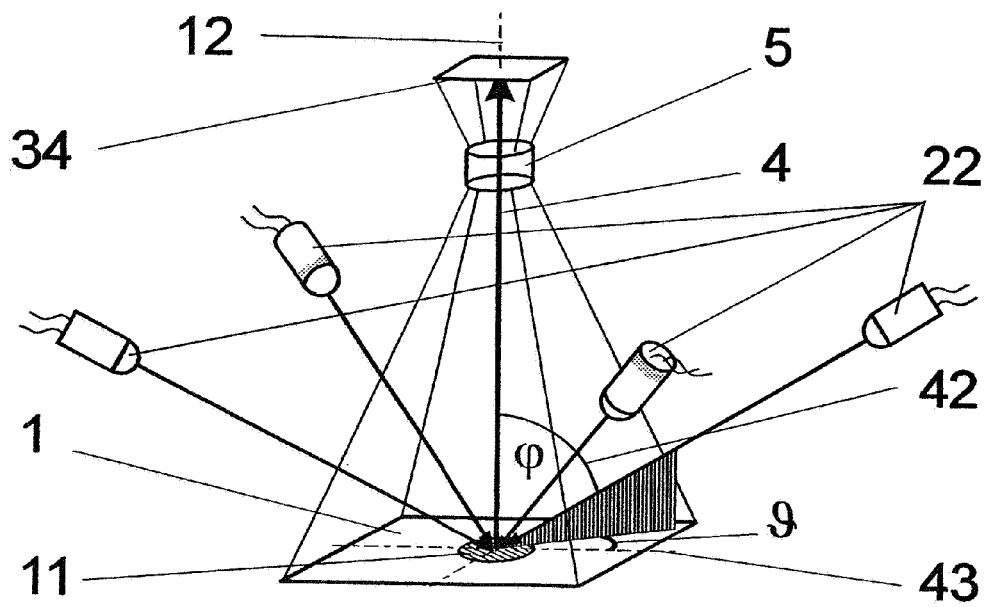
FIG. 4 shows an arrangement according to the invention that is modified with respect to FIG. 1, with an optical imaging system that images the document on an image sensor.

FIG. 4 shows the same basic construction as FIG. 1 with the addition of imaging optics 5 which image the document 1 on the image sensor 34. On the one hand, the imaging optics 5 enable optical detection and readout of the entire document 1, including image information and text information, and therefore also make it possible to determine the document type and the type and position of the diffraction structure 11. With knowledge of the position of the document 1 and of the optical diffraction structure 11, it is possible to check whether or not light 4 deflected to the image sensor 34 was deflected at the correct position (i.e., by the diffraction structure 11) and did not occur, e.g., through reflections on other surface parts of the document 1.

This construction of the invention makes it possible to optically detect document data (image data and text data) and check the optical diffraction structure 11 simultaneously with only one receiver, the image sensor 34, as is described with reference to FIG. 1.

Figure 5:
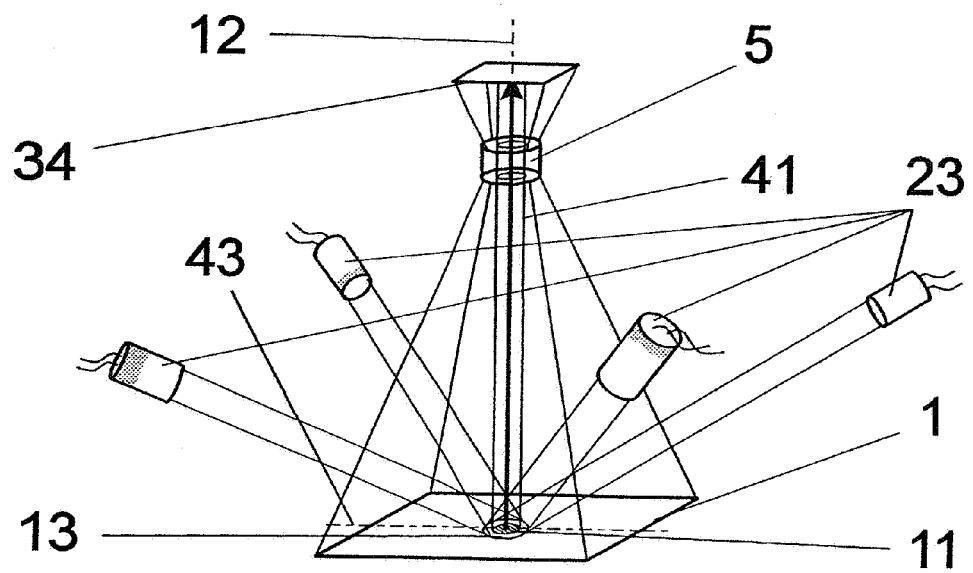
FIG. 5 shows another construction of the arrangement in FIG. 4 in which the light sources are constructed as floodlamps for generating quasi-parallel light bundles.

FIG. 5 shows an arrangement which has been modified compared to FIG. 4 in which light sources 23 are constructed as floodlamps, e.g., as an LED array or point light source with optics, for generating a quasi-parallel light bundle. The surface 13 on the document 1 is illuminated by the light bundles of the light sources 23. The surface 13 is larger than the surface of the optical diffraction structure 11. This arrangement is appreciably less sensitive to displacement or rotation of the optical diffraction structure 11 out of the position required for checking.

Figure 6:
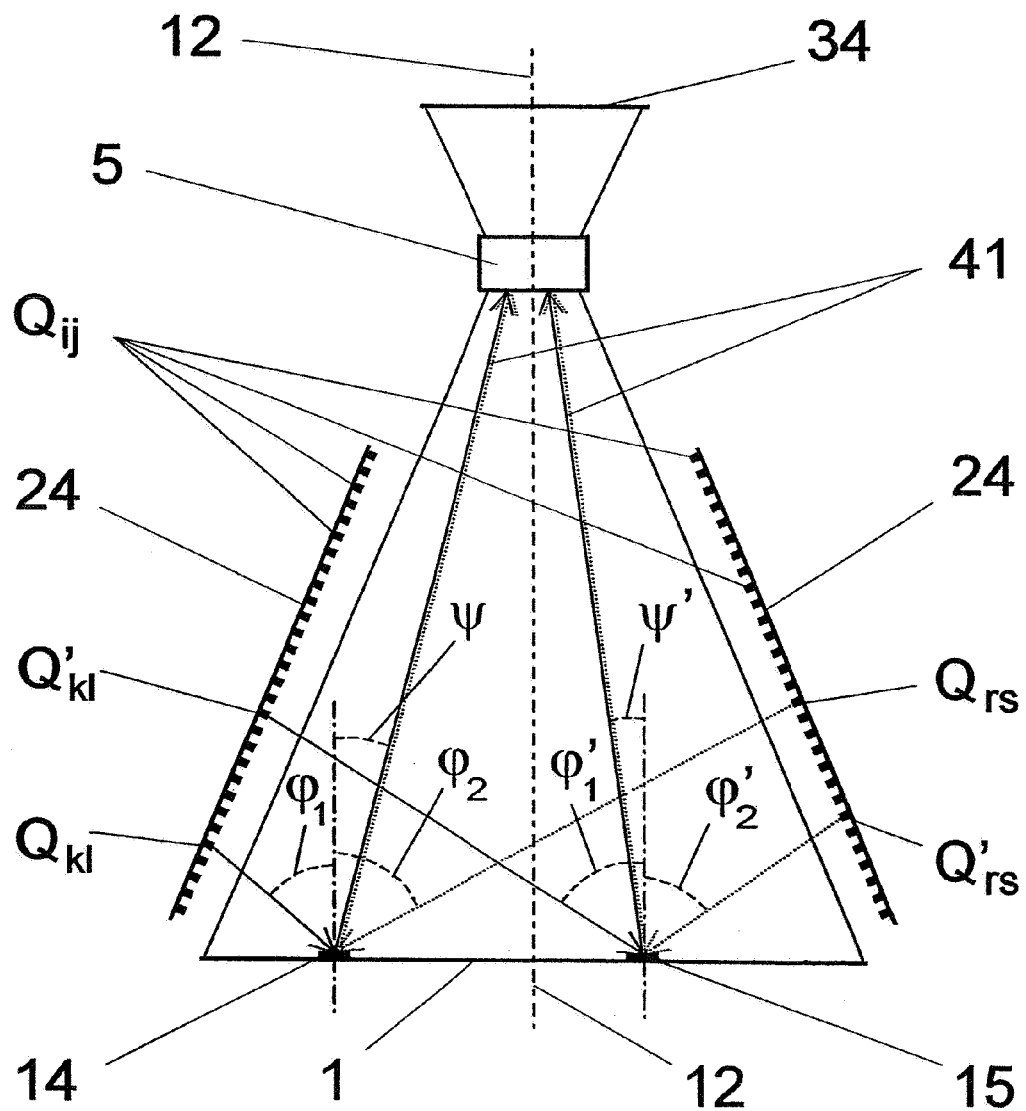
FIG. 6 is a schematic view of another construction of the invention with two-dimensional light source arrays and an image sensor by which optical diffraction structures can be checked at any point on the entire document.

FIG. 6 schematically shows an arrangement which makes it possible to check optical diffraction structures 11 at any location on the document 1. For this purpose, two-dimensional light source arrays, e.g., LED arrays, 24 are arranged laterally outside of the imaging beam path of the document 1 over the imaging optics 5 on the image sensor 34. The individual light sources $Q_{ij}$, which are arranged on the arrays 24 in rows and columns or in other patterns favoring a high component density, can be switched on individually or in optionally selectable groups. Because of the two-dimensional character of the light source arrays 24—although they are arranged only on two sides of the document lying opposite one another—it is possible to realize incident angles 42 (according to FIG. 1) in space that are defined by one component with respect to the surface normal 12 and a second component with respect to a parallel axis 43 relative to the outer edge of the document 1. For the sake of simplicity, only incident angles φ lying in the drawing plane are shown in FIG. 6. Other incident angles 42 can be realized in an analogous manner by rotating the drawing plane by an angle component θ (not shown in FIG. 6) around the center of the diffraction structure 11 in question (hereinafter: first and second positions of diffraction structures 14 and 15).

With respect to the array 24, assuming that the individual light sources Q are arranged in rows and columns and that k and l, as row and column numbers, respectively, identify the position of an individual light source $Q_{kl}$, the light bundle of the individual light source $Q_{kl}$ (or a group of closely adjacent individual light sources around the individual light source $Q_{kl}$) is radiated on a first diffraction structure 14 at a defined incident angle $\phi_1$ where it generates a diffracted light bundle 41 at an angle ψ, which diffracted light bundle 41 is transmitted to the image sensor 34 by imaging optics 5.

In the same way, there is an individual light source $Q_{rs}$ (or a group of individual light sources closely adjacent to $Q_{rs}$) on the oppositely located light source array 24 whose emitted radiation impinges on the first diffraction structure 14 at incident angle $\phi_2$ and is deflected at this first diffraction structure 14 at angle ψ in an analogous manner. Checking can be carried out from more than two directions when these directions are encoded in the first diffraction structure 14 and an angle component θ, mentioned above, is taken into account.

If there is a second diffraction structure 15 on the document 1 or the first diffraction structure 14 has changed position due to a displacement and/or rotation of the document 1 (and is therefore interpreted as a second diffraction structure), it is possible to check the diffraction structure 15 with the present arrangement without having to reposition the document 1.

The light bundle of the individual light source $Q'_{kl}$ (or of a group of individual light sources closely adjacent around individual light source $Q'_{kl}$) is radiated at a defined incident angle $\phi_1'$ on the second diffraction structure 15, where it generates a diffracted light bundle 41 at an angle ψ', which diffracted light bundle 41 is imaged on the image sensor 34 by imaging optics 5.

In the same way, there is an individual light source $Q'_{rs}$ (or a group of individual light sources Q closely adjacent to $Q'_{rs}$) on the oppositely located light source array 24, and the radiation emitted by it impinges at an incident angle ($\phi_2'$ on the diffraction structure 15, where it is deflected at an angle ψ' in an analogous manner. Checking can again be carried out from a plurality of directions if these directions are encoded in the second diffraction structure 15.

All individual light sources $Q_{ij}$ or $Q'_{ij}$ (or groups closely adjacent thereto) which radiate on the first or second diffraction structure 14 or 15 from directions for which the respective diffraction structure 14 or 15 is not encoded generate deflected light bundles at angles that are not equal to ψ or ψ' and accordingly do not strike the imaging optics 5, so that light bundles deflected in this way (not shown) also do not reach the image sensor 34.

This arrangement makes it possible to check diffraction structures 15 (or 11) that are not in the standard position 14 on the document 1; that is, it is also possible to detect positional deviations of the document 1 such as displacement or rotation in the document plane and, therefore, positional deviations of the diffraction structure 15 by means of imaging and evaluating the document 1 and to switch on defined individual light sources $Q_{ij}'$ in such a way that it is also possible to check the diffraction structure 15 situated in any manner.

Another advantage of this arrangement is the possibility of checking optical structures and holograms having a different appearance at different illumination angles. For this purpose, the individual light sources $Q_{ij}$ that illuminate the document 1 at given angles are controlled individually or in groups in such a way that—considered from the direction of the image sensor 34—an expected image appears and can be detected by the image sensor 34 for further checking by means of image processing software.

Graphics (e.g., holograms) that change depending on the illumination angle can be detected in this way by sequential switching of the light sources Q of the LED array 24 or 24' and by generating a synchronous image sequence and can bee checked for authenticity.

Figure 7:
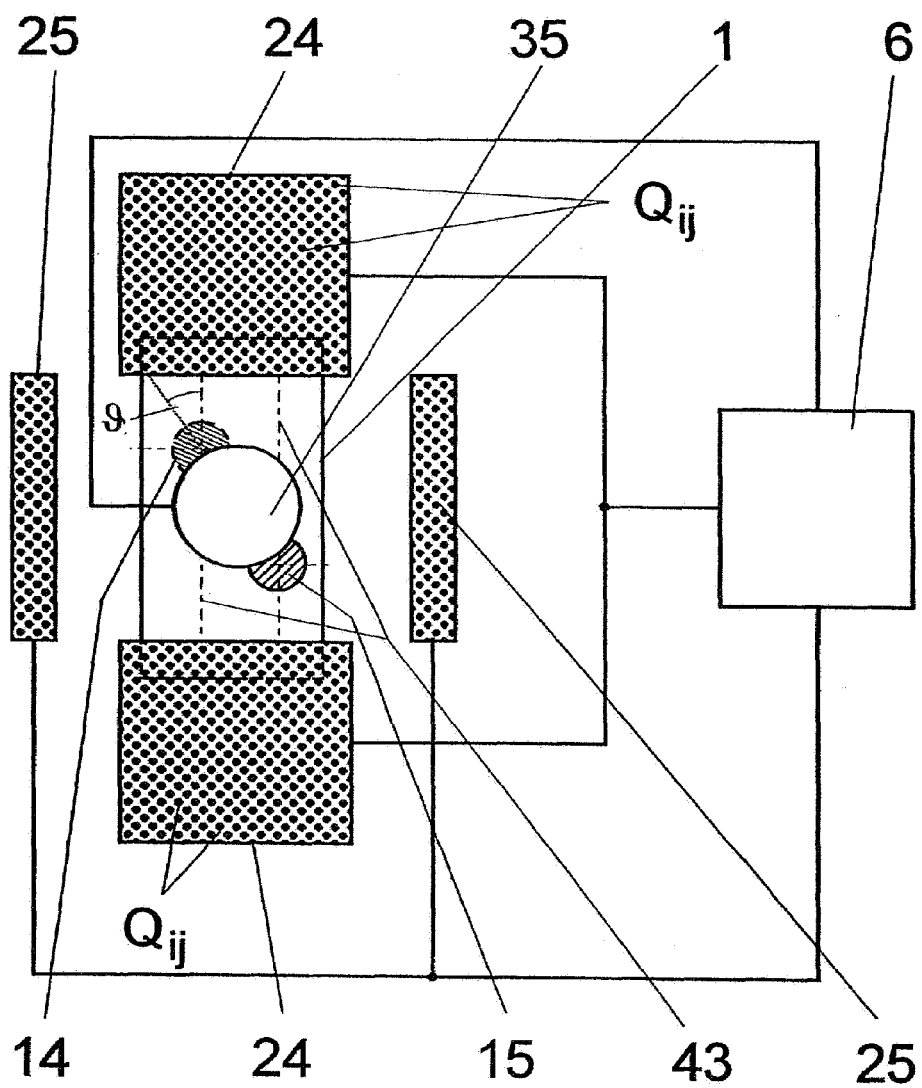
FIG. 7 shows a top view of the embodiment form in FIG. 6 with additional light source arrays for a white-light illumination for image recording.

FIG. 7 shows an arrangement for optical readout of a document 1 and for checking an optical diffraction structure 11 that is fixedly connected to the document 1 as a security feature. The combination of imaging optics 5 and image sensor 34 serves as an image recording system 35 in addition to the optical detection or readout of the contents of the document 1.

Without changing the arrangement, the presence and authenticity of an optical diffraction structure 11 (kinegram) on the document 1 can be checked starting at the time of the optical detection or at another suitable time after the image recording and image evaluation by simultaneously or successively switching on suitable light sources 22 or 23 (referring to FIG. 1, 4 or 5) with individual light sources $Q_{ij}$ or $Q_{ij}'$ that are suitably fixed with respect to position.

Knowledge of the characteristics of the diffraction structure 11 to be checked is necessary for correct selection of the individual light sources $Q_{ij}$ or $Q_{ij}'$ because the diffraction signals obtained by the image recording system 35 can be interpreted as correct only through the information about the angles (incident angle 42 in space according to FIG. 1) at which the specific diffraction structure 11 of a document type must be illuminated. For this purpose, a controlling and evaluating unit 6 is provided, by which the readout of the image recording system 35 is synchronized, on the one hand, with the control of illumination arrays 25 for image recording of the document 1 (at least with white light, additionally also with UV radiation and/or IR radiation) and, on the other hand, with the switching on of the suitable light sources 22 and 23 (as is described with reference to FIG. 1, 4 or 5) as individual light sources (or light source groups) $Q_{ij}$ or $Q_{ij}'$ of the light source arrays 24 or 24'. Further, storage means, as a database, are provided in the controlling and evaluating unit 6 and contain sets of suitable light sources 22 or 23 (or groups of light sources) for different document types (e.g., personal documents from different governments). This database can be optionally expanded by learning diffraction structures 11 of the different document types and/or diffraction structures 14 or 15 (see FIG. 6) in different positions with respect to the image recording system 35.

Figure 8:
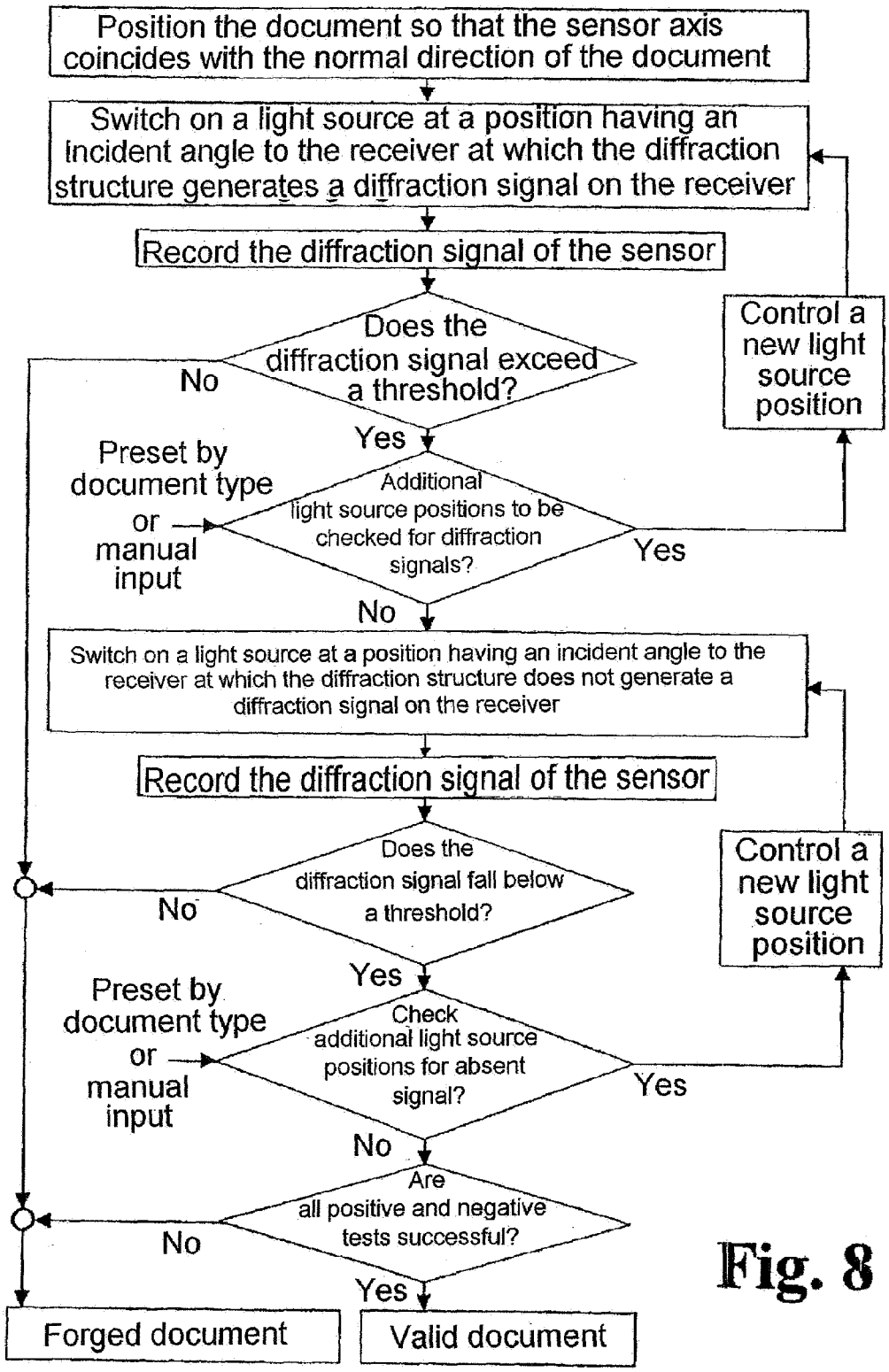
FIG. 8 is a flowchart showing the method, according to the invention, for checking the authenticity of a document based on a mechanical checking of the diffraction structure (known kinegram)

With respect to the embodiments of the invention according to FIG. 1, 4 or 5, a method for checking the diffraction structure 11 of a known document type will be explained in the following with reference to FIG. 8. The document 1 to be checked has—without limiting the generality of documents with a plurality of diffraction structures—an optical diffraction structure 11.

In a first step, it is ensured that the axis of the sensor unit 3 is parallel to a surface normal 12 of the document 1. When using an individual sensor—as is assumed in FIG. 1—which can only detect diffraction signals of diffracted light 4 along the surface normal 12 over the diffraction structure 11, it must also be ensured that the surface normal 12 on the diffraction structure 11 coincides with the sensor axis.

Subsequently, as is further shown by the flowchart in FIG. 8, light sources 22 (or 23 according to FIG. 4) are successively directed to the diffraction structure 11 at defined incident angles 42 (to be considered as compound angles in space with two components ($\phi$, $\theta$)), wherein a diffraction signal must occur in the sensor unit 3 (positive test) assuming a proper diffraction structure 11.

The diffracted light 4 that is deflected at the diffraction structure 11 is then received by the sensor unit 3 (or the image sensor 34). If the intensity of the diffracted light 4 does not exceed a given threshold when a suitable light source 22 is triggered, the diffraction structure 11 is to be classified as invalid and the associated document is forged or damaged.

Triggering of additional suitable light sources 22 (or 23) and evaluation of the intensities of diffracted light 4 can be dispensed with when at least one additional light source which must not generate a diffraction signal in the sensor unit 3 when the diffraction structure 11 is valid (negative test) is switched on in the following step.

If a given lower threshold is exceeded in this negative test with the associated readout of the sensor unit 3 (or of the image sensor 34 in FIGS. 4 and 5), the document is forged.

If the first positive test, described above, produces a diffraction signal of sufficient intensity in the sensor unit 3 using suitable light sources 22 (or 23), checking may proceed in two different ways:

A) Additional (at least one) suitable light source(s) 22 (or 23) are (is) switched on, the associated diffraction signal is recorded and assessed relative to the given threshold. If this positive test and, as the case may be, further positive tests are above the threshold (for the positive test), the diffraction structure 11 is in order and the checked document 1 is valid. For additional security, a subsequent negative test in which the signal of the sensor unit 3 remains below a given lower threshold can provide conclusive certitude.

B) A successful positive test is followed immediately by the negative test and the signal received by the sensor unit 3 when the additional light source is switched on for the negative test is compared to the lower threshold. If the threshold is not exceeded, the checked document 1 is valid. One or more additional light sources (for the negative test) can be switched on in order to ensure the results.

In another procedure, the positive test can also be conducted with a plurality of suitable light sources 22 (or 23) in such a way that all suitable light sources 22 (or 23) are triggered simultaneously and a sum signal of the intensities of all diffraction signals are subjected to a correspondingly increased threshold evaluation. This procedure assumes that the diffraction structure 11 transforms radiated light intensities into analog diffraction signals. As a rule, no further negative testing is required if the given threshold is exceeded by the sum signal. The negative test then serves only to confirm the absolute reliability of the positive results. However, if the sum signal remained below the threshold and it can be seen (e.g., by comparing to a second, somewhat lower signal) that the sum signal fell below the threshold only slightly, then—assuming that it fell below its threshold—the subsequent negative test can be used immediately to declare the document 1 valid. If the negative test is above the threshold determined for it, the document is forged (or damaged, i.e., equally invalid).

Figure 9:
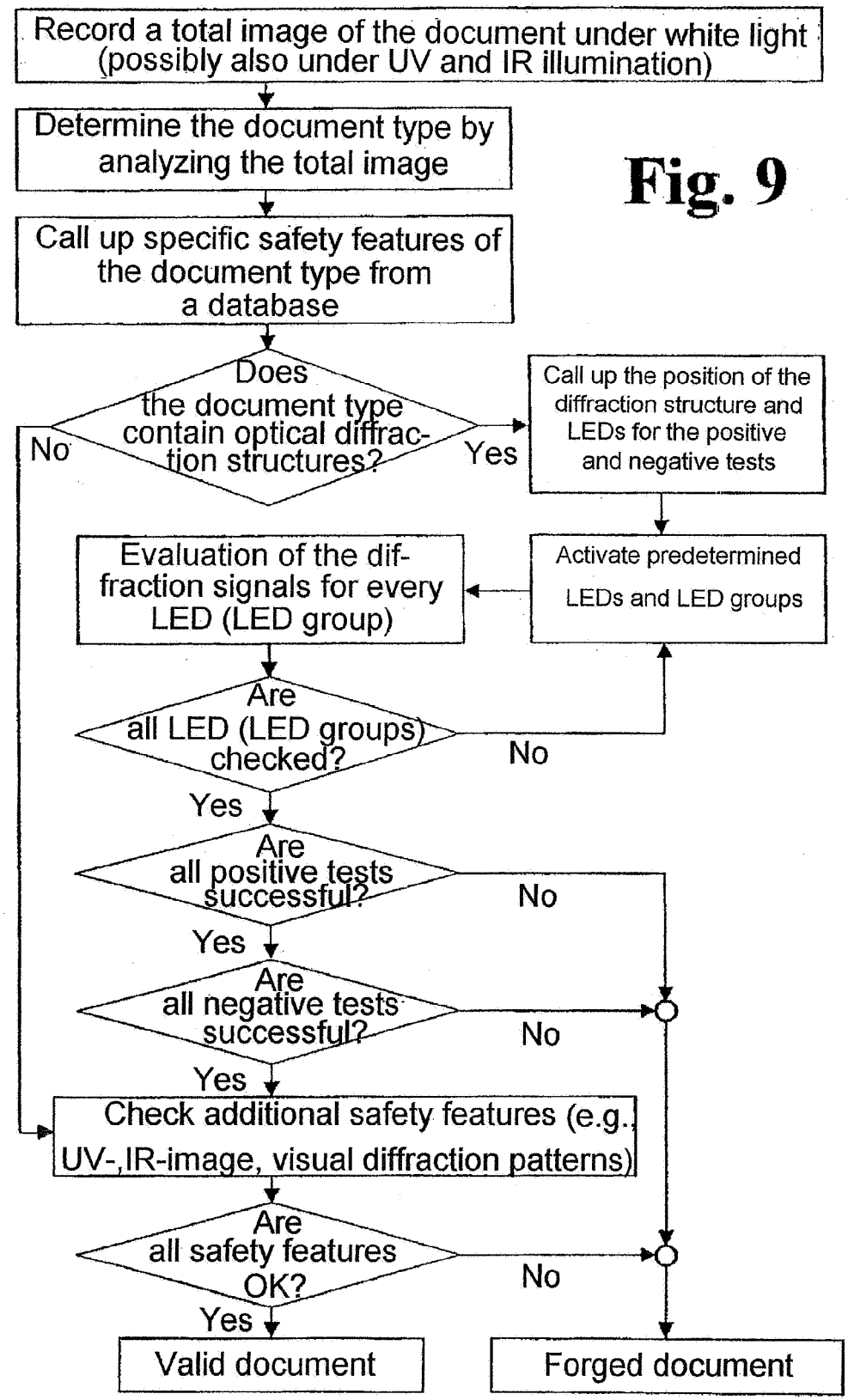
FIG. 9 is a flowchart showing the checking process for checking a document with detection of text information and image information, particularly for detecting the presence and the position of the diffraction structure, i.e., the document type, as a reasonable precondition for checking the diffraction structure (kinegram)

The method sequence shown in FIG. 9 is based on constructions according to FIGS. 6 and 7.

By controlling the illumination arrays 25 and the synchronously operated image recording system 35 comprising imaging optics 5 and image sensor 34, an optical image of the document 1 is generated on the image sensor 34 and the document type and its diffraction structure 11 are detected by applying image processing algorithms that are carried out in a computing unit (carrying the controlling and evaluating unit 6). At the same time, the actual position of the diffraction structure 11 can be detected when positional deviations of the document are to be permitted.

After the document type has been determined, the position of the diffraction structure 11 is called up from a database. The database supplies information about the specific makeup of the diffraction structure 11 to be checked, i.e., the solid angles at which diffraction signals are to be expected in the standard position of the diffraction structure 11. Using these solid angles (and the positions of individual light sources $Q_{ij}$ that are already stored for the standard position of the diffraction structure 11), specific light source positions $Q_{ij}'$, because of whose activation diffraction signals are to be expected on the image sensor 34, are determined from the image information about the current position of the diffraction structure 11 and the stored diffraction angles (positive test). When the quantity of positive tests that is prescribed for the document type is concluded, an assessment is made analogous to the procedure in FIG. 8 about whether or not all of the completed positive tests were successful (i.e., were above the prescribed threshold). If not, the document 1 is invalid (forged or damaged).

In order to discover document forgeries in which a reflecting or light-deflecting material other than the optical diffraction structure 11 is present, additional individual light sources $Q_{ij}'$ for which no diffraction light 4 impinges on the image sensor 34 when the diffraction structure 11 is genuine (negative test) are triggered in addition to the individual light sources $Q_{ij}'$ that are expected to generate diffraction signals on the image sensor 34. When optical diffraction structures 11 are forged, rays that are nevertheless deflected by these light sources impinge on the image sensor 34.

This provides an additional possibility for testing the authenticity of the document 1 according to the following plan:

I) If light bundles 41 that were expected to be diffracted by the specific optical diffraction structure 11 were not received by the image sensor 34, the document is invalid (forged or damaged).

II) If light bundles 41 that were expected to be diffracted by the specific optical diffraction structure 11 were received by the image sensor 34, additional individual light sources $Q_{ij}'$ (or groups) are triggered for a negative test.

IIa) If light is received by the image sensor 34 with these additional individual light sources $Q_{ij}'$ (or groups), the document is likewise invalid (forged).

IIb) If no light is received by the image sensor 34 with the additional individual light sources $Q_{ij}'$ (or groups) after the light bundles 41 that were expected to be diffracted led to the expected diffraction signals, the document is likewise valid.

III) With some diffraction structures 11, information about intensity can be evaluated in addition to the binary information about whether or not the beam is deflected, so that when a new document type is learned, not only the coordinates (ij) of the individual light sources $Q_{ij}$ that are associated with the angle coordinates ($\phi$, $\psi$) but also an associated expected intensity is detected in addition to the respective coordinates (i, j). During checking, the measured intensity is then compared with the stored intensity for a light source group that is learned in this way. When the measured intensity lies outside a defined tolerance, the document is forged (or damaged).

In all three of the above cases in which conclusions are reached about the validity of the document 1, a threshold criterion is used (as was described with reference to FIG. 8) to investigate whether or not the negative tests were successfully run (were below a lower threshold). If this is not the case, the results show that the document 1 is invalid (forged or damaged).

If the results of the negative test were successful after the positive tests were also successful, additional security features (e.g., holograms, steganograms, etc.) can be checked in addition before the document 1 is declared valid (assuming a positive outcome).

Figure 10:
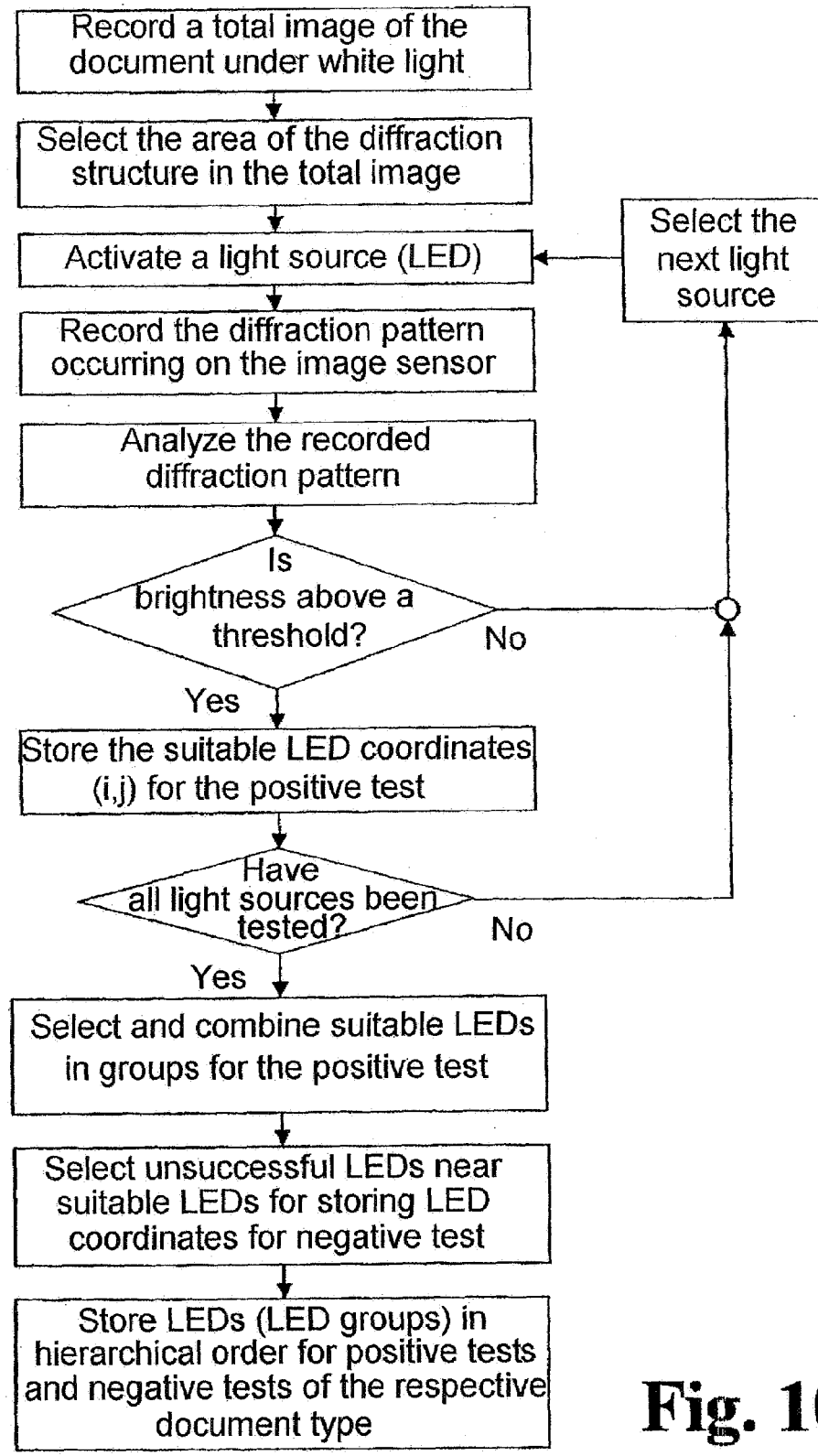
FIG. 10 shows a possible process for learning a new document type with diffraction structure.

Since the diffraction structures 11 on the documents 1 are usually not exactly perpendicular under the imaging optics 5 and differ with different document types, it is necessary to learn this document type based on an authorized model document once before checking a new document type. In this connection, FIG. 10 indicates a method by which a learning process of this kind can be advantageously run.

After the model document is oriented to or on a support surface, a total image of the model document is recorded by the imaging optics 5 and the image sensor 34 by illuminating the document 1 by means of the illumination arrays 25, the area in which the diffraction structure 11 is located is determined, and the position within the entire document 1 is stored.

The individual light sources $Q_{ij}$ of the light source arrays 24 are then switched on in sequence and an image is recorded by the image sensor 34. This step can be shortened when the characteristics of the optical diffraction structure 11 are known in that only the individual light sources $Q_{ij}$ in the expected useful areas for checking are switched on.

By evaluating the image sequence obtained in this way, in which it is checked whether or not an intensity value lies above a defined threshold, the coordinates (i, j) of the individual light sources $Q_{ij}$ from which diffracted light bundles 41 impinge on the image sensor 34 (positive test) are determined. These coordinates (i, j) are initially stored temporarily so that, after switching on all of the (useful) individual light sources $Q_{ij}$, the light positions that are best suited for document checking can be selected and stored in the database for the corresponding document type, possibly so as to be ordered hierarchically in suitable groups.

When checking documents 1 of the same type as the model document, the coordinates (i', j') of the current light sources $Q_{ij}'$ to be turned on can be obtained from the stored positions (i, j) of the individual light sources $Q_{ij}$ by means of a correction algorithm from the model data set by using the actual position determined by image analysis compared to the stored position of the diffraction structure 11 to be checked. The individual light sources $Q_{ij}'$ determined in this way with coordinates (i', j') are then triggered in series and an image sequence is recorded for checking (positive test).

Further, coordinates of light sources $Q_{ij}'$ in the vicinity of the suitable light sources (suitable for the positive test) in which no diffracted light 4 may reach the image sensor 34 (negative test) are determined according to the determined actual position of the diffraction structure 11.

With some diffraction structures 11, intensity information can be evaluated for each diffracted light bundle 41 in addition to the binary information about whether or not diffracted light 4 occurs at a determined solid angle. For diffraction structures 11 of this kind, not only the coordinates (i, j) of the suitable light sources 22 or 23 (or individual light sources $Q_{ij}$ of the light source arrays 24) that are associated with the angle coordinates ($\phi$, $\psi$) but also, in addition to the respective light source coordinates, associated expected intensities of the diffracted light bundles 41 are detected when learning a new document type.

During checking, the measured intensity can then be compared with the stored intensity for a group of suitable light sources 22 (or 23 or individual light sources $Q_{ij}$ of light source arrays 24) learned in this way. A tolerance must be determined empirically for deviations of the measured intensity from the expected intensity.

Further, it is possible to switch on a group of suitable light sources 22 (23 or $Q_{ij}$ from arrays 24) simultaneously when checking and to determine a sum signal of the intensities and assess it with a suitable tolerance criterion. A sum signal of this kind is likewise measured and stored in the learning process and reasonable tolerances are determined.

While the foregoing description and drawings represent the present invention, it will be obvious to those skilled in the art that various changes may be made therein without departing from the true spirit and scope of the present invention.

What is claimed is:

1. An arrangement for checking optical diffraction structures on documents comprising:
an illumination unit for illuminating at least the diffraction structure of the document and a sensor unit for detecting light components that are diffracted at defined angles being arranged above a support surface of the document;
said sensor unit being arranged orthogonally above the support surface of the document;
said illumination unit containing at least two monochromatic light sources which are arranged so as to emit light bundles at defined incident angles with respect to a surface normal of the document directed to the diffraction structure and which can be switched on sequentially;
at least one light source having an incident angle that corresponds in direction and degree to a diffraction angle at which an intensity maximum of the diffraction pattern that is generated in a structure-specific manner would occur if the diffraction structure were illuminated from the direction of the sensor unit; and
said sensor unit being synchronized with the illumination unit in order to detect diffraction signals associated with the switched on light sources.

2. The arrangement according to claim 1, wherein the light sources of the illumination unit are arranged at different incident angles which correspond respectively, with respect to their degree and direction, to different diffraction angles of the diffraction structure.

3. The arrangement according to claim 1, wherein the illumination unit has at least one additional light source in which the direction and degree of the incident angle are not associated with any defined diffraction angle of the diffraction structure.

4. The arrangement according to claim 1, wherein the illumination unit contains two-dimensional light sources so that checking of the document is not sensitive to different positions of the diffraction structure.

5. The arrangement according to claim 4, wherein light sources with an expanded parallel light bundle are provided in the illumination unit for illuminating the entire diffraction structure at defined incident angles.

6. The arrangement according to claim 4, wherein groups of closely adjacent light sources are provided in the illumination unit for illuminating the entire diffraction structure at defined incident angles.

7. The arrangement according to claim 4, wherein the illumination unit has at least one two-dimensional light source array, wherein the light sources of the light source array can be controlled individually or in groups.

8. The arrangement according to claim 4, wherein the illumination unit has at least one microprism foil in order to multiply the light source locations.

9. The arrangement according to claim 4, wherein the illumination unit has at least one microlens foil for parallelizing the illumination.

10. The arrangement according to claim 4, wherein the illumination unit has Fresnel lenses for parallelizing the illumination.

11. The arrangement according to claim 7, wherein the light source array comprises light emitting diodes.

12. The arrangement according to claim 11, wherein the illumination unit contains a plurality of two-dimensional light source arrays that are arranged at an inclination parallel to the edges of the document to be checked and can be switched on individually.

13. The arrangement according to claim 12, wherein at least two oppositely located light source arrays have the same dimensions and inclination.

14. The arrangement according to claim 1, wherein the sensor unit has an image sensor which is provided for successively recording an optical image of the document and for recording light that is diffracted by the diffraction structure, and the illumination unit contains additional light sources for generating illumination which is suitable for recording the optical image.

15. The arrangement according to claim 14, wherein the illumination unit for image recording of the document contains additional light sources for generating white light illumination.

16. The arrangement according to claim 14, wherein the illumination unit for image recording contains additional light sources for generating ultraviolet illumination.

17. The arrangement according to claim 14, wherein the illumination unit for image recording contains additional light sources for generating infrared illumination.

18. The arrangement according to claim 14, wherein the diffraction structure can be checked for authenticity in any position relative to the image sensor when its position has been determined from the optical image of the entire document, wherein a suitable light source or group of light sources can be switched on in which a light bundle that is diffracted at the diffraction structure in a defined manner impinges on the image sensor.

19. The arrangement according to claim 14, wherein the image sensor is designed for additional image recording of diffraction patterns for visual assessment, and specific groups of light sources of the illumination unit for evaluating visual diffraction pattern are directed at defined angles to the visual diffraction pattern.

20. A method for checking optical diffraction structures on documents in which light components that are diffracted by a diffraction structure at defined angles are detected by a sensor unit above a support surface of the document, comprising the following steps:

directing at least two monochromatic light sources directed to the diffraction structure at defined incident angles with respect to the surface normal of the diffraction structure and of the sensor unit;

illuminating the diffraction structure by at least one light source at an incident angle which corresponds in direction and degree to a diffraction angle of the diffraction structure, at which diffraction angle there would occur an intensity maximum of a diffraction pattern that is generated in a structure-specific manner if the diffraction structure were illuminated from the direction of the sensor unit; and switching on different light sources with different incident angles;

reading out the sensor unit synchronous to the differently positioned light sources in order to detect diffraction signals of the diffraction structure that are associated with the switched on light sources in the direction of the sensor unit.

21. The method according to claim 20, wherein the diffraction structure is illuminated with respect to the surface normal by at least two light sources at defined incident angles which correspond, respectively, in direction and degree to one of the different diffraction angles of the diffraction pattern of the diffraction structure if the diffraction structure were illuminated from the direction of the sensor unit.

22. The method according to claim 20, wherein at least one light source illuminates the diffraction structure with respect to the surface normal at an incident angle that corresponds in direction and degree to a diffraction angle of the diffraction pattern if the diffraction structure was illuminated from the direction of the sensor unit, and at least one additional light source illuminates the diffraction structure with respect to the sensor unit at a different incident angle that does not correspond to a diffraction angle of the diffraction pattern of the diffraction structure if the diffraction structure was illuminated from the direction of the sensor unit.

23. The method according to claim 21, wherein the diffraction structure is illuminated simultaneously by at least two light sources at different incident angles which correspond, respectively, to a diffraction angle of the diffraction pattern of the diffraction structure occurring when illumination is effected from the direction of the sensor unit, in which case the sensor unit receives a sum signal of the intensities of the light bundles that are diffracted by the diffraction structure.

24. The method according to claim 20, wherein, in addition to the diffraction signals from the diffraction structure that are detected by the sensor unit, an optical image of the document is recorded by an image sensor for detecting image data and text information.

25. The method according to claim 24, wherein diffraction signals generated by the diffraction structure are likewise recorded by the image sensor.

26. The method according to claim 24, wherein light sources arranged in uniformly ordered light source arrays are selected and switched on so as to be suited to the respective diffraction structure in order to illuminate different diffraction structures of different types of documents.

27. The method according to claim 26, wherein the type and position of the diffraction structure is determined from the image information in relation to the image sensor and suitable light sources of the light source arrays, for which the incident angle of the light bundle of the light source and the exit angle of the light bundle diffracted by the diffraction structure, taken together, lead to a defined diffraction signal on the image sensor, are switched on in series.

28. The method according to claim 27, wherein, after switching on suitable light sources for detecting a diffraction signal on the sensor unit, additional light sources of the light source arrays for which the incident angle of the light source and the exit angle of the diffracted light bundle, taken together, may not generate a diffraction signal on the image sensor in a known diffraction structure are switched on.

29. The method according to claim 27, wherein groups of adjacent light sources with a substantially identical incident angle with respect to the diffraction structure are switched on simultaneously.

30. The method according to claim 26, wherein groups of light sources with different incident angles with respect to the diffraction structure are switched on simultaneously in order to detect a sum signal of intensities of different light bundles that are diffracted at the diffraction structure so that the results of checking the diffraction structure are achieved within a very short measuring period.

31. The method according to claim 26, wherein suitable light sources for checking the diffraction structure of a new document type are learned in that an authorized model document with variously positioned diffraction structures is provided by selecting and storing the positions of suitable light sources with which diffracted light bundles result in a maximum diffraction signal on the image sensor.

32. The method according to claim 26, wherein for the purpose of checking the diffraction structure of a new document type, in addition to learning suitable light sources, additional light sources with which no diffraction signal is generated on the image sensor are learned in that an authorized model document with variously positioned diffraction structures is provided by selecting and storing positions of the additional light sources which do not generate diffracted light on the image sensor.

33. The method according to claim 31, wherein positions of light sources with which light that is diffracted at the diffraction structure still results in a sufficiently distinctive diffraction signal on the image sensor are learned and stored in order to compensate for slight positional deviations of the diffraction structure.

* * * * *